(12) United States Patent
Guha

(10) Patent No.: US 7,007,072 B1
(45) Date of Patent: *Feb. 28, 2006

(54) METHOD AND SYSTEM FOR EFFICIENTLY STORING WEB PAGES FOR QUICK DOWNLOADING AT A REMOTE DEVICE

(75) Inventor: Aloke Guha, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 859 days.

This patent is subject to a terminal disclaimer.

(21) Appl. No.: 09/887,803

(22) Filed: Jun. 22, 2001

Related U.S. Application Data

(63) Continuation of application No. 09/362,013, filed on Jul. 27, 1999, now Pat. No. 6,272,534.

(51) Int. Cl.
*G06F 15/167* (2006.01)
*G06F 15/16* (2006.01)
*G06F 15/173* (2006.01)
*G06F 17/30* (2006.01)

(52) U.S. Cl. .................................. 709/216; 707/10
(58) Field of Classification Search ................ 709/217, 709/223–226, 212, 216; 707/10
See application file for complete search history.

(56) References Cited

U.S. PATENT DOCUMENTS

| | | |
|---|---|---|
| 5,390,318 A | 2/1995 | Ramakrishnan et al. |
| 5,475,819 A | 12/1995 | Miller et al. |
| 5,588,131 A | 12/1996 | Borrill |
| 5,737,619 A | 4/1998 | Judson |
| 5,758,361 A | 5/1998 | van Hoff |
| 5,787,466 A | 7/1998 | Berliner |
| 5,802,292 A * | 9/1998 | Mogul .................... 709/203 |
| 5,845,148 A * | 12/1998 | Ichikawa et al. ............ 710/8 |
| 5,852,717 A | 12/1998 | Bhide et al. |
| 5,859,971 A | 1/1999 | Bittinger et al. |
| 5,870,769 A * | 2/1999 | Freund ................ 715/501.1 |
| 5,887,151 A * | 3/1999 | Raz et al. ................ 712/206 |
| 5,889,958 A | 3/1999 | Willens |
| 6,011,537 A * | 1/2000 | Slotznick ................. 715/733 |
| 6,085,193 A * | 7/2000 | Malkin et al. ............. 707/10 |
| 6,088,032 A * | 7/2000 | Mackinlay .............. 715/848 |
| 6,182,072 B1 * | 1/2001 | Leak et al. ................ 707/10 |
| 6,282,542 B1 * | 8/2001 | Carneal et al. ............ 707/10 |
| 6,390,318 B1 * | 5/2002 | Tanaka et al. ............ 711/158 |

(Continued)

OTHER PUBLICATIONS

Joseph P. Touch, Defining High Speed Protocols: Five Challenges and an Example that Survives the Challenges, IEEE Journal on Selected Areas in Communications, vol. 13, No. 5, Jun. 1995, pp. 828-835.

*Primary Examiner*—Bunjob Jaroenchonwanit
*Assistant Examiner*—Ramsey Refai
(74) *Attorney, Agent, or Firm*—Brooks Kushman P.C.

(57) ABSTRACT

A web server for efficiently storing web pages for quick downloading at a remote device includes first and second storage devices. The first storage device stores a first plurality of web pages and receives a first signal from the remote device indicating selection of one of the first plurality of web pages. The second storage device stores a second plurality of web pages linked to the first plurality of web pages, and transfers all of the second plurality of web pages that are linked to the selected one of the first plurality of web pages to the first storage device in response to the first signal. In such a fashion, the web server facilitates quickly downloading selected web pages to the remote device.

12 Claims, 3 Drawing Sheets

U.S. PATENT DOCUMENTS

| | | | |
|---|---|---|---|
| 6,442,651 B1 * | 8/2002 | Crow et al. | 711/118 |
| 6,549,896 B1 * | 4/2003 | Candan et al. | 707/2 |
| 6,721,780 B1 * | 4/2004 | Kasriel et al. | 709/203 |
| 6,751,709 B1 * | 6/2004 | Seidl et al. | 711/137 |
| 6,766,422 B1 * | 7/2004 | Beyda | 711/137 |
| 6,807,570 B1 * | 10/2004 | Allen et al. | 709/219 |
| 2002/0091788 A1 * | 7/2002 | Chlan et al. | 709/213 |

* cited by examiner

METHOD AND SYSTEM FOR EFFICIENTLY STORING WEB PAGES FOR QUICK DOWNLOADING AT A REMOTE DEVICE

This application entitled METHOD AND SYSTEM FOR EFFICIENTLY STORING WEB PAGES FOR QUICK DOWNLOADING AT A REMOTE DEVICE is: A continuation under 37 C.F.R. § 1.53(b) of prior application Ser. No. 09/362,013 filed on Jul. 23, 1999, now U.S. Pat. No. 6,272,534, entitled METHOD AND SYSTEM FOR EFFICIENTLY STORING WEB PAGES FOR QUICK DOWNLOADING AT A REMOTE DEVICE.

TECHNICAL FIELD

This invention relates to methods and systems for efficiently storing web pages at a server for quick downloading at a remote device in communication with the server.

BACKGROUND ART

Traditional web servers depend on sequential access to HTML (HyperText Markup Language) pages by loading hyperlinked pages as the client requests them while navigating through the current page. Each client initiated hit involves a random access to the memory, even if multiple clients access the same page. Thus, overall latency is high even when there is an overlap in the access. Latency refers to the amount of time it takes a web server to respond to a client beginning from the time the request was sent by the client to the server. To reduce latency in the network, some proposals have been made to have local machines, mostly proxy servers, to prefetch the pages linked to the current page before the client actually "hits" them. However, since all web pages may not be requested by the client, storage is wasted. Furthermore, bandwidth is also wasted. If a user is on a public area network, the user will pay for the time of access or number of bytes transferred every time he/she uses the bandwidth. Consequently, if the network is busy, aggressive prefetching can be expensive.

File servers, on the other hand, typically utilize a hierarchical storage manager (HSM) in managing access of data stored on disk and tape. An application program in an HSM configuration examines memory usage in the hard drive. Instead of putting all files, or data, on the hard drive, the program will keep a subset of the files on the hard drive and the rest on the tape. By ensuring that the most currently or frequently used files are on the hard drive, most accesses are satisfied by accesses to the hard drive, i.e., hits.

If the file required is not on the hard drive, i.e., a miss, a memory request is sent to the tape. Since the tape is slower than the disk, the time to retrieve the file is higher. Since the access is usually to the disk, this penalty is only apparent on a small percentage of the accesses. Thus, the main motivation for using HSM is cost. Tape is significantly cheaper and denser than a hard drive. However, in some file requests, latency will suffer.

Thus, there exists a need for a method and system for efficiently storing scaleable amounts of data at a web server that can be quickly accessed by a client without compromising bandwidth.

DISCLOSURE OF THE INVENTION

It is a general object of the present invention to provide a method and system for efficiently storing web pages at a server for quick downloading at a remote device in communication with the server.

In carrying out the above object and other objects, features, and advantages, in one embodiment of the present invention a method is provided for efficiently storing web pages for quick downloading at a remote device in a computer network including a server computer having a first storage device for storing a first plurality of web pages, a second storage device for storing a second plurality of web pages linked to the first plurality of web pages, and a third storage device coupled to the computer for storing a third plurality of web pages linked to the first plurality of web pages. The method includes receiving a first signal from the remote device at the server computer indicating selection of one of the first plurality of home pages. The method also includes transferring at least one of the second plurality of web pages linked to the selected one of the first plurality of web pages from the second storage device to the first storage device in response to the first signal. Still further, the method includes transmitting a second signal from the second storage device to the third storage device in response to the first signal. The method also includes transferring at least one of the third plurality of web pages linked to the selected one of the first plurality of web pages from the third storage device to the second storage device in response to the second signal wherein anticipated web pages linked to the selected one of the first plurality of web pages are quickly accessible by the remote device.

In further carrying out the above object and other objects, features, and advantages, in another embodiment of the present invention, a web server is provided for carrying out the above described method. The web server includes a first memory for storing a first plurality of web pages and for receiving a first signal from the remote device indicating selection of one of the plurality of web pages. The web server also includes a second storage device for storing a second plurality of web pages linked to the first plurality of web pages and for transferring at least one of the second plurality of web pages linked to the selected one of the first plurality of web pages to the first storage device in response to the first signal. The second storage device is further provided for transmitting a second signal in response to the first signal. The web server further includes a third storage device for storing a third plurality of web pages linked to the first plurality of web pages, receiving the second signal, and transferring at least one of the third plurality of web pages linked to the selected one of the first plurality of web pages to the second memory in response to the second signal wherein anticipated web pages linked to the selected one of the first plurality of web pages are quickly accessible by the remote device.

The above object and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
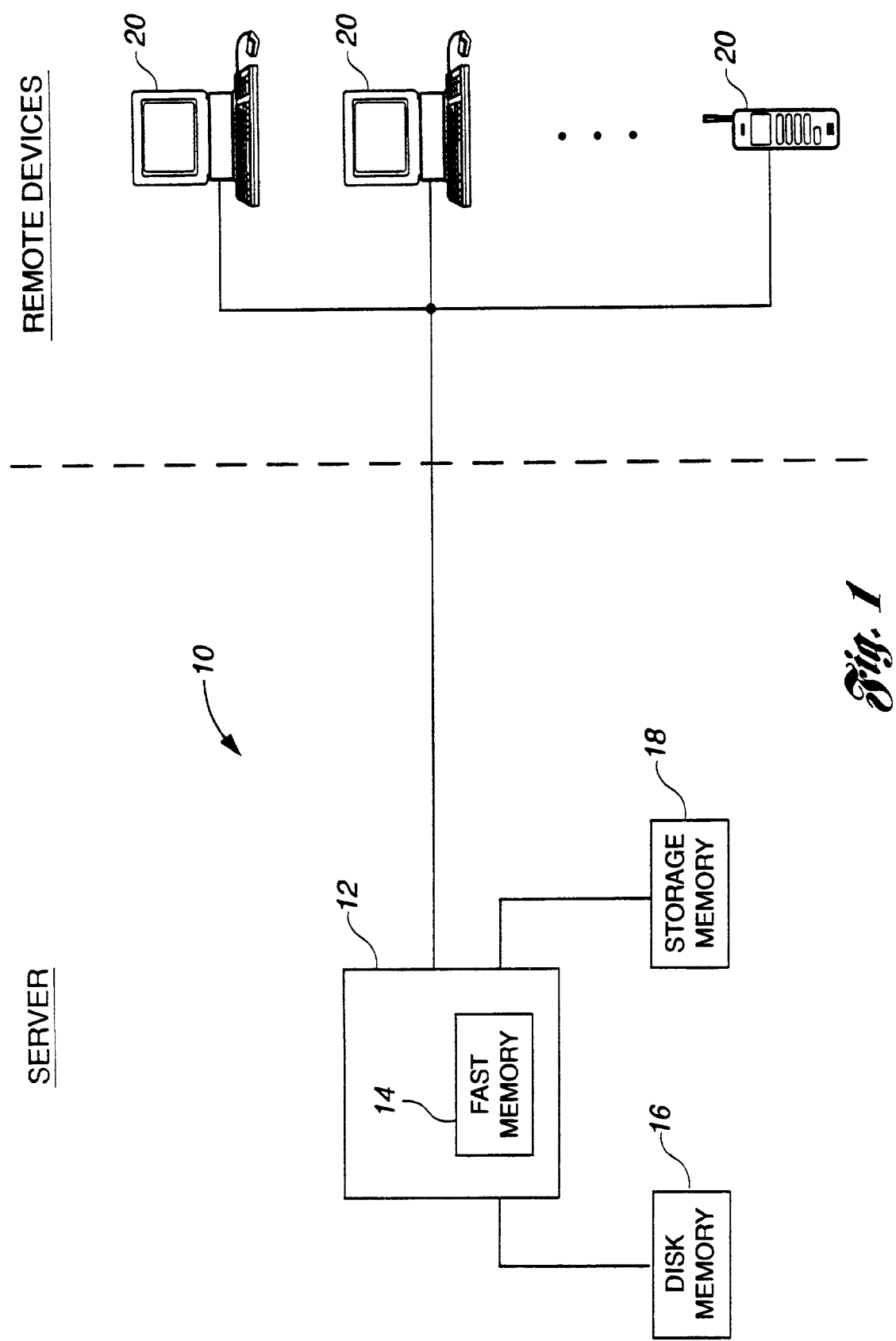
FIG. 1 is a schematic diagram of the storage-efficient web server of the present invention.

A schematic diagram of the storage-efficient web server is shown in FIG. 1, denoted generally by reference numeral 10. The server 10 includes a computer 12 such as, for example, a workstation or a high-end personal computer. The server 10 hosts a plurality of web sites, wherein each web site includes a plurality of HTML documents, or web pages.

The computer 12 of the server 10 includes a fast memory 14, such as cache or RAM (random access memory), and a disk memory 16. Although shown externally, the disk memory 16 may be either an internal disk drive or an externally attached disk or disk farm, such as a RAID (redundant array of inexpensive disks). Both the fast memory 14 and the disk memory 16 store a portion of the web pages for quick downloading as will be described in greater detail below.

The computer 12 is also connected to an external storage device 18, such as tape or removable media, which stores even more data relating to the web pages. The storage device 18 can be connected to the computer 12 either directly via a point-to-point link, as shown in FIG. 1, or indirectly via a storage area network. The server 10 is in communication with a plurality of remote devices 20 which can download any of the web pages stored at the server 10. Examples of such devices include a computer, an Internet-ready telephone, etc.

As shown in FIG. 1, a three-tier hierarchy exists; fast memory 14, disk memory 16 and storage device 18, where the traditional assumption of lower access speed, larger capacity, and lower cost holds true as one moves down the hierarchy. While in most cases these may represent cache or RAM, disk and tape, any other forms of storage that satisfies the access speed, capacity and cost monotonicity also applies. In any case, the storage hierarchy, which can be extended to more than three tiers, forms a serial buffer chain where the cache in fast memory 14 is supported by a cache in disk memory 16 which in turn is supported by the data in the storage device 18.

Also, this chained buffer configuration allows the possibility of data to be transferred between fast memory 14 and disk memory 16 while storage device 18 transfers data to disk memory 16, provided disk memory 16 utilizes a typical double buffer so that one buffer feeds disk memory 16 while the second buffer is filled by storage device 18. This simultaneous data transfer between hierarchies is possible as long as disk memory 16 possesses adequate data bandwidth and connectivity either through direct point-to-point links or through a storage area network.

Figure 2:
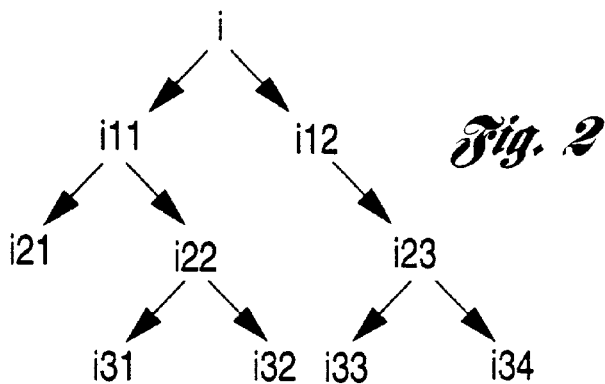
FIG. 2 is a directed page graph for a page sequence that begins with page i.

The server 10 of the present invention reduces cache space at fast memory 14 storage level which results in fewer pages of a web site being put on the computer 12 while off-loading successive pages in the second level storage of the storage device 18. Before continuing with the description of the present invention, an exemplary directed page graph is shown in FIG. 2 for a page sequence that begins with page i. Note that because the page numbering convention is visit order independent, the naming sequence is not unique. Therefore, many different page graphs can result in the same page number sequence.

Figure 3:
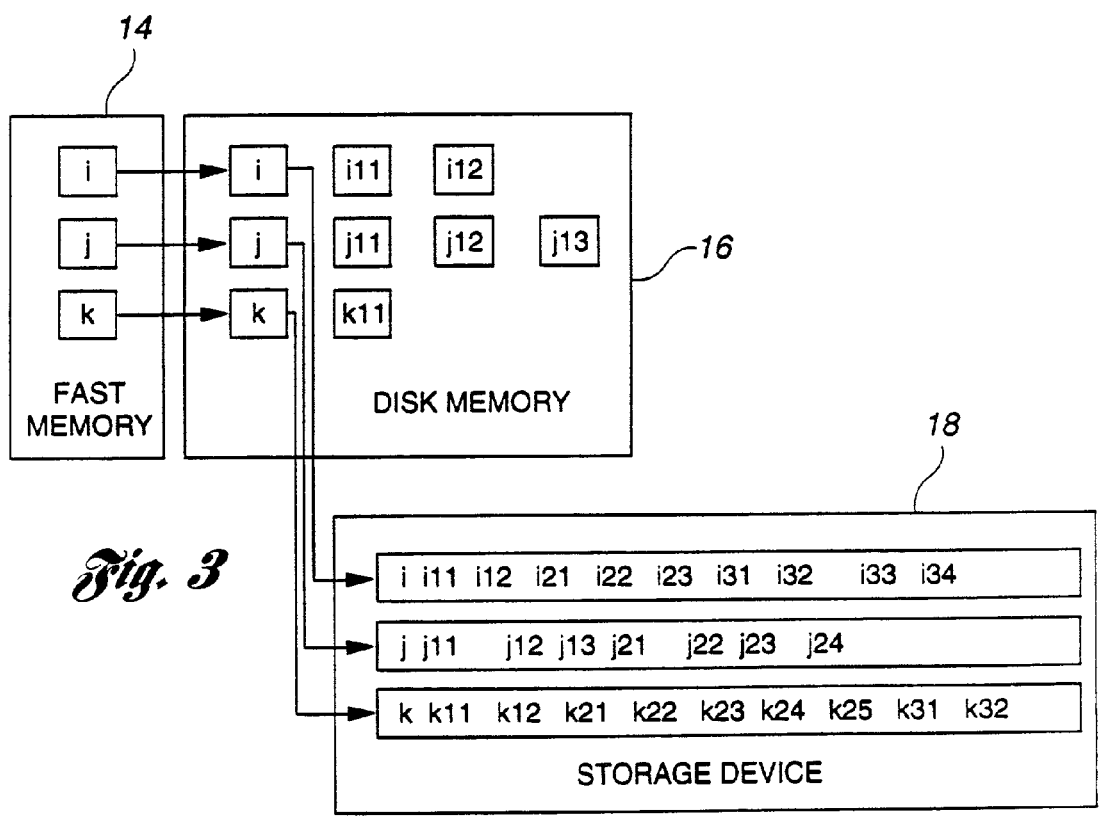
FIG. 3 is an example of a page distribution in the server storage hierarchy.

Returning to the discussion of the present invention, in order to reduce the cache space at the fast memory 14, a large number of the first level home pages, i.e., the first page of the web sites, i, j, k, etc. are stored in the fast memory 14, as shown in FIG. 3. Disk memory 16 contains a larger sequence of subsequent levels of the web site pages, i.e., i, $i_{11}$ and $i_{12}$, where $i_{jk}$ refers to the kth hyperlinked page on the jth level.

First level home pages, e.g., i, are kept in fast memory 14 while the pages $i_{11}$ and $i_{12}$, hyperlinked by i, are kept in disk memory 16. The cache in fast memory 14 has links to locations on disk memory 16, as shown by the connections in FIG. 3. That is, when cached page i is accessed from fast memory 14, a pointer points to the location (address) of the same page i in disk memory 16. Similarly, the sequence for pages $i_{11}$, $i_{12}$ in disk memory 16 reference the address in storage device 18 so that on further access (beyond $i_{12}$ in disk memory 16), the server 10 knows where to fetch the rest of the pages from storage device 18.

When there is a hit on i in fast memory 14, all pages linked to i in disk memory 16 are read into fast memory 14 even before there is a hit on any of $i_{11}$ or $i_{12}$. Therefore, while the page is sent to the client, fast memory 14 reads in $i_{11}$ and $i_{12}$, according to the example shown in FIG. 2. Thus, prefetching of certain pages from disk memory 16 reduces the total number of home pages that normally resides in fast memory 14. By using cache space reuse, described below, the space in fast memory 14 can be kept relatively small for each web site hosted.

Cache space reuse implies that the cache used in fast memory 14 is kept to a fixed maximum per home page. This is achieved by prefetching from disk memory 16, discarding pages not required in the cache for fast memory 14 and reading in pages from storage device 18.

Figure 4:
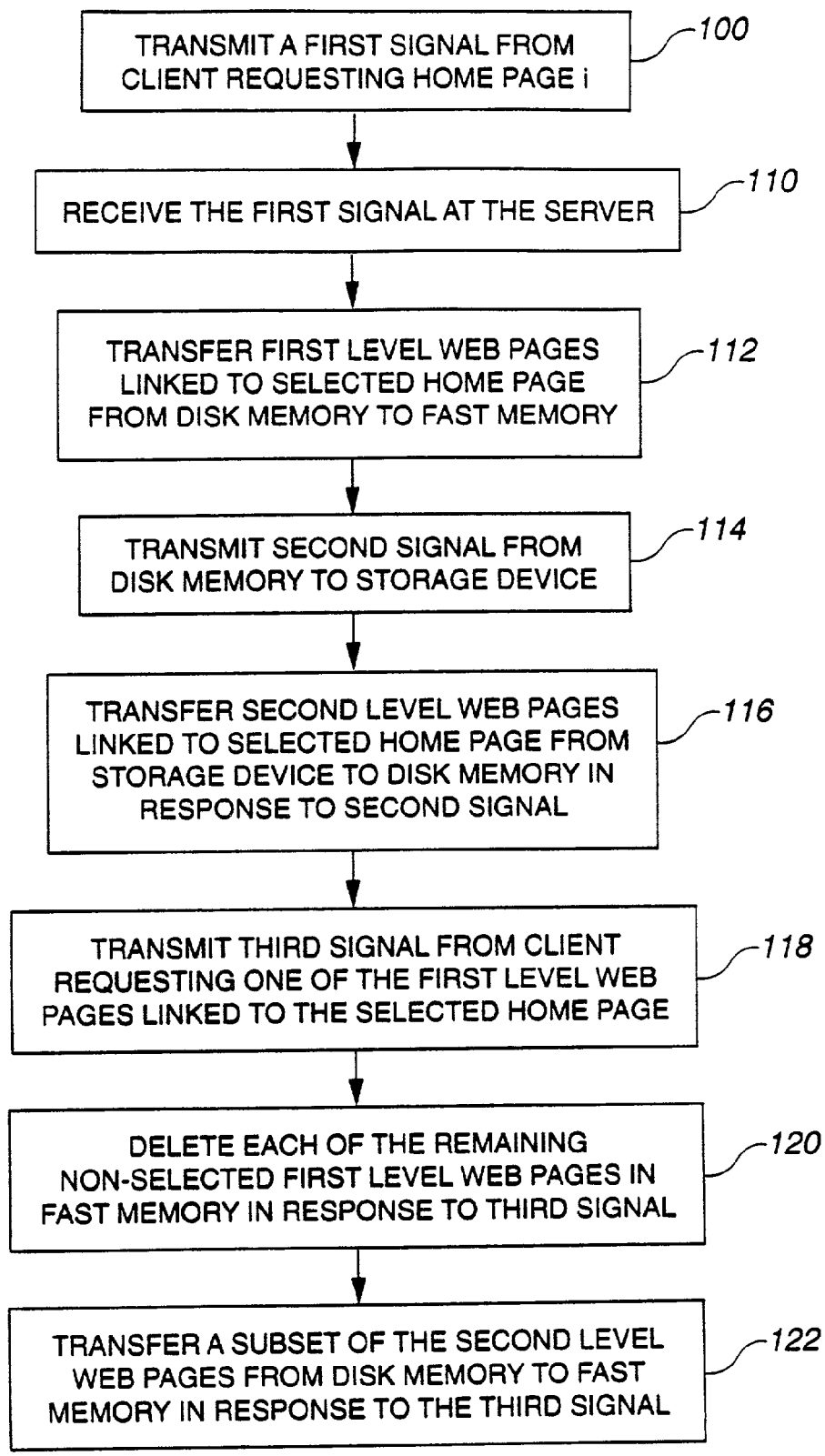
FIG. 4 is a flow diagram illustrating the general sequence of steps associated with the present invention.

To follow on the simple example described above with reference to FIGS. 2 and 3, the following sequence is executed, as shown in FIG. 4. In the following example, it is assumed that disk memory 16 stores only the first level of web pages linked to the home page, while storage device 18 stores the remaining levels of web pages linked to the home page. The storage space of disk memory 16 actually depends on the access time of locating partitions in storage device 18, i.e., finding the address in storage device 18 where the pages are written. For example, an address utilized in a disk-type storage device 18 is identified by a {sector, track, block number} descriptor. If storage device 18 is very fast, then either only the first level or the first and second level pages only could be stored in disk memory 16. A further explanation of the storage space of disk memory 16 is described in greater detail below.

In continuing with the example, a first signal is transmitted from a client at one of the remote devices 20 requesting one of the home pages, e.g., i, as shown at block 100. The server computer 12 receives the first signal, as shown at block 110.

In response to the first signal, disk memory 16 transfers the first level web pages linked to the selected home page, i.e., $i_{11}$ and $i_{12}$, to fast memory 14, as shown at block 112. At the same time, disk memory 16 transmits a second signal to storage device 18 requesting specific data, as shown at block 114. In response to the second signal, storage device 18 transfers the second level web pages linked to the selected home page to disk memory 16, i.e., $i_{21}$, $i_{22}$ and $i_{23}$, as shown at block 116.

If the client requests one of the first level web pages, e.g., $i_{12}$, a third signal is transmitted from the remote device 20 accordingly, as shown at block 118. Fast memory 14 then deletes the remaining non-selected first level web pages, i.e., page $i_{11}$, as shown at block 120, and sends the selected web page to the client. Since disk memory 16 has read in and stored pages $i_{21}$, $i_{22}$, $i_{23}$, etc., from storage device 18, disk memory 16 transfers the second level web pages related to page $i_{12}$, i.e., page $i_{23}$, to fast memory 14. Similarly, disk memory 16 may delete the non-selected second level web pages if cache memory size is a concern. Then, disk memory 16 transmits a fourth signal to storage device 18 requesting the web pages linked to the selected page $i_{23}$, i.e., pages $i_{33}$ and $i_{34}$. The method continues in a like manner as the client requests additional web pages.

It is possible that the client may proceed to traverse the web pages in a reverse order back to a previous web page where there were more than one possible path from that web page, e.g., page i utilizing the example shown in FIG. 2. In this instance, upon reaching that web page, disk memory 16 transmits a signal to storage device 18 requesting the web pages linked to that page, e.g. pages $i_{11}$ and $i_{12}$, as described at block 112. Thus, disk memory 16 anticipates the client's request by insuring fast memory 14 always has all of the first level web pages related to the selected web page stored therein. At the same time, disk memory 16 insures that all of the second level web pages related to the selected web page are stored in disk memory. This is achieved via memory re-use as described above.

The above sequence depends on the access time of locating partitions in storage device 18, wherein partitions correspond to the portion of the storage device 18 that comprises all the web pages and sequences of the associated web site. If the time to access a partition in storage device 18 is $t_{M2}$, then the number of pages to be kept in M1 will be dependent on two factors: i) average size, $s(i_{jk})$, of an individual page $i_{jk}$ at any level j in the page directed graph, and ii) reaction time of the client, assumed fixed $t_r$. The level j of the number of pages to be hosted in disk memory 16 is determined according to the following:

$$j \ni \sum_{j} t_p + t_r + \frac{s(i_{jk})}{L} \geq t_{M2}$$

where $t_p$ is the average propagation delay between client and server, L is the average link bandwidth, or effective data rate, between the client and server 10, and $s(i_{jk})$ over k represents the average size of the pages at level j.

A simple explanation of the limit to j is as follows. Each level of the tree traversed (i.e., j=1, 2, etc.) provides the server 10 the following time window consisting of the client reaction time, $t_r$, which is probably 0.25 seconds for the average human, the delay or propagation time, $t_p$, and the time of flight $s(i_{jk})/L$ to send the average page at level j to the client to access storage device 18. As the average page size $s(i_{jk})$ increases, its time of flight provides a larger time window during which access to a slow storage device 18 can be masked due to the limited link bandwidth L. The propagation delay is typically ignored since the client can be at any arbitrary distance from the server 10.

The above inequality is somewhat conservative since it assumes that the average page size is a good indicator of the time of flight. In the case where there is a large variation in file size, the mean should be replaced with a minimum, $\text{Min}(s(i_{jk}))$. This results in increasing the depth of the pages to be stored and potentially increases the storage required in disk memory 16.

An example illustrating the use of the above limit is as follows. If the link bandwidth L to the server 10 is 56 Kbs, the average page size at each level in the page directed graph of the home page sequence is 50 KB, and the access time to storage device 18 is eight seconds, then at least two levels of pages (j=2) must be resident in disk memory 16. In case of the i page sequence, pages i, i11, i12, i21, i22 and i23 must be kept in disk memory 16.

Typically, however, the average page loaded on the Web is only 6 KB. This implies that a larger depth (level) of pages may be stored in disk memory 16 for a fixed size cache. However, since the pages are of smaller size, the total storage required (i.e., number of pages per level*average size per page*number of levels) will not be significantly different.

To ensure that successive pages can be read from storage device 18 with no perceived latency, a quasi-sequential access of the levels is utilized, i.e., page $i_{j+1,l}$ is always read after page $i_{j,k}$ even when k<1. If $i_{j,k}$=i11, then $i_{j+1,l}$=$i_{21}$, where l is any integer 1, 2, 3, ..., etc. Access to web site pages is not totally random since only certain paths can be traversed by a client, nor is the access totally sequential since each web site typically has multiple yet a finite number of links on each level. By exploiting this quasi-sequentiality, slow sequential access storage devices can be exploited.

All home page sequences are added at a boundary of the partition so that the partition can be accessed with moderately low deterministic access time. Vertical partitioning works well in this case, i.e., data stored sequentially. If access time increases to further out partitions, one can place home pages with very large pages at the further ends and home pages with small pages at the beginning of the device 18, i.e., vertical partitioning. In vertical partitioning, each partition starts from the same starting point and proceeds from left to right so that the access time to the first page on any partition is zero whenever the tape is read.

Clearly, storage devices 18 that exhibit low partition access latency will be well-suited to developing hierarchical storage web servers as disclosed herein with very large capacities and with the added benefit of fully masking latencies to disk memory 16 and storage device 18.

However, the storage device 18 may be a non-sequential device, such as, for example, a random access optical disk. In this case, the present invention is still valid even though partitioning as described above is not necessary.

While the best modes for carrying out the invention have been described in detail, those familiar with the art to which this invention relates will recognize various alternative designs and embodiments for practicing the invention as defined by the following claims.

What is claimed is:

1. In a computer network including a server computer having a first storage device for storing a first plurality of web pages, a second storage device for storing a second plurality of web pages linked to the first plurality of web pages, the server computer in communication with a third storage device for storing a third plurality of web pages linked to the first plurality of web pages, a method for efficiently storing web pages for quick downloading at a remote device, the method comprising:

receiving a first signal from the remote device at the server computer indicating selection of one of the first plurality of web pages;

transferring all of the second plurality of web pages that are linked to the selected one of the first plurality of web pages from the second storage device to the first storage device in response to the first signal;

transmitting a second signal from the second storage device to the third storage device in response to the first signal; and transferring all of the third plurality of web pages that are linked to the selected one of the first plurality of web pages from the third storage device to the second storage device in response to the second signal so that anticipated web pages linked to any web pages selected by the remote device are quickly accessible by the remote device.

2. The method of claim 1 wherein transferring all of the second plurality of web pages includes deleting each of the non-selected first plurality of web pages in the first storage device and wherein transferring all of the third plurality of web pages includes deleting each of the non-selected second plurality of web pages in the second storage device.

3. The method of claim 1 wherein storing the second plurality of web pages linked to the first plurality of web pages includes:
   determining one of an average size and a minimum size of each web page linked to each of the first plurality of web pages; and
   determining a reaction time of a client operating the remote device.

4. The method of claim 3 further comprising:
   determining an average propagation delay between the client and the web server;
   determining an average link bandwidth between the client and the server; and
   determining a time to access a partition in the storage device.

5. The method of claim 1 wherein storing the third plurality of web pages includes storing the third plurality of web pages at a horizontal partition boundary.

6. The method of claim 1 wherein storing the third plurality of web pages includes storing the third plurality of web pages at a vertical partition boundary.

7. A system for providing quick downloading of web pages at a remote device, the system comprising:
   a server computer;
   a first storage device in communication with the server computer for storing a first plurality of web pages and for receiving a first signal from the remote device indicating selection of one of the first plurality of web pages;
   a second storage device in communication with the first storage device, the second storage device for storing a second plurality of web pages linked to the first plurality of web pages and for transferring all of the second plurality of web pages that are linked to the selected one of the first plurality of web pages to the first storage device in response to the first signal, the second storage device further for transmitting a second signal in response to the first signal; and
   a third storage device in communication with the first storage device, the third storage device for storing a third plurality of web pages linked to the first plurality of web pages and for transferring all of the third plurality of web pages that are linked to the selected one of the first plurality of web pages to the second storage device in response to the second signal so that anticipated web pages linked to any web pages selected by the remote device are quickly accessible by the remote device.

8. The system of claim 7 wherein the first storage device is further operative to delete each of the non-selected first plurality of web pages in response to the first signal, and wherein the second storage device is further operative to delete each of the non-selected second plurality of web pages in response to the second signal.

9. The system of claim 7 wherein the second storage device, in storing the second plurality of web pages linked to the first plurality of web pages, stores the second plurality of web pages based on one of an average size and a minimum size of each web page linked to each of the first plurality of web pages and a reaction time of a client operating the remote device.

10. The system of claim 9 wherein the second storage device is further operative to store the second plurality of web pages based on an average propagation delay between the client and the server, an average link bandwidth between the client and the server, and an access time to access a partition in the storage device.

11. The system of claim 7 wherein the third storage device, in storing the third plurality of web pages, is operative to store the third plurality utilizing a horizontal partition boundary.

12. The system of claim 7 wherein the third storage device, in storing the third plurality of web pages, is operative to store the third plurality utilizing a vertical partition boundary.

* * * * *